(12) United States Patent
Enkovaara et al.

(10) Patent No.: US 9,548,939 B2
(45) Date of Patent: Jan. 17, 2017

(54) SWITCH DEVICE FOR A NETWORK ELEMENT OF A DATA TRANSFER NETWORK

(71) Applicant: CORIANT OY, Espoo (FI)

(72) Inventors: Kim Enkovaara, Espoo (FI); Mika Silvola, Kempele (FI)

(73) Assignee: CORIANT OY, Espoo (FI)

( * ) Notice: Subject to any disclaimer, the term of this patent is extended or adjusted under 35 U.S.C. 154(b) by 96 days.

(21) Appl. No.: 14/504,650

(22) Filed: Oct. 2, 2014

(65) Prior Publication Data

US 2015/0098337 A1 Apr. 9, 2015

(30) Foreign Application Priority Data

Mar. 10, 2013 (FI) ..................................... 20135989

(51) Int. Cl.
*H04L 12/863* (2013.01)
*H04L 12/851* (2013.01)
*H04L 12/803* (2013.01)
*H04L 12/26* (2006.01)
(Continued)

(52) U.S. Cl.
CPC ......... *H04L 47/627* (2013.01); *H04L 43/0888* (2013.01); *H04L 43/0894* (2013.01); *H04L 47/125* (2013.01); *H04L 47/2441* (2013.01); *H04L 47/32* (2013.01); *H04L 47/54* (2013.01); *H04L 49/506* (2013.01)

(58) Field of Classification Search
CPC .. H04L 47/627; H04L 47/2441; H04L 47/125; H04L 43/0888; H04L 43/0894; H04L 47/32; H04L 47/54

USPC ................ 370/230, 235, 236, 252, 389, 412
See application file for complete search history.

(56) References Cited

U.S. PATENT DOCUMENTS

| | | |
|---|---|---|
| 6,657,962 B1 | 12/2003 | Barri et al. |
| 6,667,985 B1 | 12/2003 | Drummond-Murray |
| 7,221,656 B1 | 5/2007 | Aweya et al. |

(Continued)

FOREIGN PATENT DOCUMENTS

GB           2411075        8/2005

OTHER PUBLICATIONS

European Search Report, dated Feb. 16, 2015, in corresponding European Patent Application No. 14186941.
(Continued)

*Primary Examiner* — Charles C Jiang
*Assistant Examiner* — Wali Butt
(74) *Attorney, Agent, or Firm* — Young & Thompson (57) ABSTRACT

A switch device for a network element includes a transfer system (110) for transferring data from ingress line interfaces of the network element to egress line interfaces of the network element in accordance with control information associated with the data. The transfer system includes a control section (111) configured to compare data traffic load to capacity available to the data traffic load at one of the egress line interfaces so as to generate a congestion indicator expressing whether a data flow (113) representing the data traffic load is a potential cause of congestion at the one of the egress line interfaces. The control section is further configured to direct a congestion control action to the data flow if the data flow is a potential cause of congestion. Thus, the congestion management related to the ingress and egress line interfaces can be carried out by the switch device.

17 Claims, 4 Drawing Sheets

(51) Int. Cl.
  *H04L 12/823* (2013.01)
  *H04L 12/931* (2013.01)

(56) References Cited

U.S. PATENT DOCUMENTS

| | | |
|---|---|---|
| 2003/0002534 A1 | 1/2003 | Hoof |
| 2006/0045011 A1 | 3/2006 | Aghvami et al. |
| 2007/0064605 A1 | 3/2007 | Ho et al. |
| 2007/0268830 A1 | 11/2007 | Li et al. |
| 2009/0003209 A1* | 1/2009 | Kalkunte ............ H04L 47/10 370/232 |
| 2011/0267942 A1* | 11/2011 | Aybay ............ H04L 41/0816 370/230 |
| 2013/0039182 A1 | 2/2013 | Das et al. |
| 2014/0269379 A1* | 9/2014 | Holbrook ............ H04L 43/0882 370/252 |

OTHER PUBLICATIONS

Floyd, Sally and Van Jacobson, "Random Early Detection Gateways for Congestive Avoidance," IEEE/ACM Transactions on Networking, vol. 1, No. 4, Aug. 1993.

Finnish Search Report, dated Jun. 23, 2014, from corresponding FI application.

\* cited by examiner

SWITCH DEVICE FOR A NETWORK ELEMENT OF A DATA TRANSFER NETWORK

FIELD OF THE INVENTION

The invention relates generally to data traffic management in a network element that can be, for example but not necessarily, an Internet Protocol router. More particularly, the invention relates to a method for managing data traffic in a switch device of a network element, where the switch device is configured to transfer data from ingress line interfaces of the network element to egress line interfaces of the network element. Furthermore, the invention relates to a switch device, to a network element comprising a switch device, and to a computer program for controlling a switch device.

BACKGROUND

In many cases a network element comprises one or more ingress line interfaces for receiving data from data transfer links of a data transfer network, one or more egress line interfaces for transmitting data to data transfer links of the data transfer network, and a switch device for transferring data from the ingress line interfaces to the egress line interfaces in accordance with control information associated with the data. The network element can be for example an internet protocol "IP" router, an Ethernet switch, an Asynchronous Transfer Mode "ATM" switch, and/or a Multi-Protocol Label Switching "MPLS" switch. Each data transfer link of the data transfer network can be for example a fiber link, a copper link, or a radio link. A commonly used construction of a network element of the kind described above is such that the network element comprises a frame and plug-in units which are installed in plug-in unit slots of the frame. Electrical or optical connectors in a plug-in unit make galvanic or optical contacts with corresponding electrical or optical connectors in the frame when the plug-in unit is inserted in the plug-in unit slot of the frame. One or more of the plug-in units may constitute the above-mentioned switch device, and other ones of the plug-in units can be line interface modules which comprise the above-mentioned ingress line interfaces and egress line interfaces. Furthermore, there can be one or more plug-in units which constitute a control and/or monitoring device and/or one or more plug-in units which constitute a power supply device.

Network elements of the kind described above should not constitute bottle necks of data transfer in order that the capacity of the data transfer links between the network elements could be effectively utilized. This requirement can be fulfilled when the data transfer capacity from the ingress line interfaces of a network element to the egress line interfaces of the network element is sufficiently high with respect to the data traffic load arriving at the ingress line interfaces and the queuing of data takes place in front of the egress line interfaces. The inherent drawback of the queuing at the egress line interfaces is that also such data which is discarded by the queue management and thereby not forwarded to the data transfer network consumes the above-mentioned data transfer capacity from the ingress line interfaces to the egress line interfaces. The virtual output queuing "VOQ" is a known technique for remedying the above-mentioned drawback. In the virtual output queuing, data is arranged to queue not only at the egress line interfaces but also at the ingress line interfaces prior to being transferred by a switch device to the egress line interfaces. The situations prevailing at the egress line interfaces are signaled to the ingress line interfaces so that the queue management is able to de-queue data from an appropriate queue at an appropriate ingress line interface and to allow the switch device to transfer the data to an appropriate egress line interface when there is room for the data in the buffer of the egress line interface under consideration. In a case of congestion, data is discarded at an ingress line interface. Thus, the data transfer capacity from the ingress line interfaces to egress line interfaces is not wasted on data that will be discarded. On the other hand, the virtual output queuing corresponds functionally to the real output queuing where the queue management is run at the egress line interfaces.

The virtual output queuing of the kind described above is, however, not free from challenges. Some of the challenges are related to the need to signal the queuing situations prevailing at the egress line interfaces to the ingress line interfaces. Especially in cases where the number of ingress line interfaces and/or the number egress line interfaces is/are high, the signaling is complex and it may represent a significant overhead in the data transfer between the ingress and egress line interfaces.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new switch device capable of being a part of a network element of a data transfer network. A switch device according to the invention comprises:

ingress interfaces connectable to ingress line interfaces of the network element, egress interfaces connectable to egress line interfaces of the network element, and a transfer system for transferring data from the ingress interfaces to the egress interfaces in accordance with control information associated with the data.

The transfer system comprises control section configured to:

compare data traffic load represented by a data flow directed to one of the egress line interfaces to a numerical value indicative of a maximum data transmission speed available to the data flow at the one of the egress line interfaces so as to generate a congestion indicator expressing whether the data flow is a potential cause of congestion at the one of the egress line interfaces, and direct a congestion control action to the data flow in response to a situation in which the data flow is, according to the congestion indicator, a potential cause of congestion, the congestion control action being one of: i) discarding a data item belonging to the data flow, and ii) marking the data item belonging to the data flow.

The above-described switch device simulates data traffic management taking place at the egress line interfaces of the network element. The simulation is based on comparing, in the switch device, data traffic loads to the capacities that are available to the data traffic loads at appropriate egress line interfaces, and on directing, in the switch device, congestion control actions to such data flows that are, according to the comparison, potential causes of congestion. Therefore, the data traffic management is carried out in the switch device and thus there is no need to signal the situations prevailing in the egress line interfaces to the ingress line interfaces.

In a switch device according to an exemplifying and non-limiting embodiment of the invention, the transfer system comprises memory and the control section is configured to write data received from the ingress line interfaces to the memory and to read a data item, e.g. an Internet Protocol "IP" packet or an Ethernet frame", from the memory when the data item is to be delivered to one or more of the egress line interfaces of the network element. The memory operates as shared buffering resource for the ingress line interfaces and for the egress line interfaces of the network element. An advantage of the shared buffering resource with respect to separate interface-specific buffering resources is that the shared buffering resource is capable of utilizing the low probability of situations where many of the line interfaces are heavily loaded simultaneously, i.e. the stochastic load balancing can be utilized. The memory can be implemented with one or more memory devices such as e.g. one or more random access memory "RAM" circuits.

In accordance with the invention, there is provided also a new network element for a data transfer network. The network element can be, for example but not necessarily, an Internet Protocol "IP" router, a multi-protocol label switching "MPLS" switch, an Asynchronous Transfer Mode "ATM" switch, a packet optical switch, and/or an Ethernet switch. A network element according to the invention comprises one or more ingress line interfaces for receiving data from a data transfer network, one or more egress line interfaces for transmitting the data to the data transfer network, and a switch device that comprises:
  ingress interfaces connected to the ingress line interfaces,
  egress interfaces connected to the egress line interfaces, and
  a transfer system for transferring the data from the ingress interfaces to the egress interfaces in accordance with control information associated with the data.

The transfer system comprises control section configured to:
  compare data traffic load represented by a data flow directed to one of the egress line interfaces to a numerical value indicative of a maximum data transmission speed available to the data flow at the one of the egress line interfaces so as to generate a congestion indicator expressing whether the data flow is a potential cause of congestion at the one of the egress line interfaces, and
  direct a congestion control action to the data flow in response to a situation in which the data flow is, according to the congestion indicator, a potential cause of congestion, the congestion control action being one of: i) discarding a data item belonging to the data flow, and ii) marking the data item belonging to the data flow.

The congestion control action is directed to the data flow advantageously but not necessarily at the ingress side of the switch device.

In accordance with the invention, there is provided also a new method for data traffic management in a switch device of a network element. The switch device is configured to transfer data from ingress line interfaces of the network element to egress line interfaces of the network element in accordance with control information associated with the data. A method according to the invention comprises:
  comparing data traffic load represented by a data flow directed to one of the egress line interfaces to a numerical value indicative of a maximum data transmission speed available to the data flow at the one of the egress line interfaces so as to generate a congestion indicator expressing whether the data flow is a potential cause of congestion at the one of the egress line interfaces, and
  directing a congestion control action to the data flow in response to a situation in which the data flow is, according to the congestion indicator, a potential cause of congestion, the congestion control action being one of: i) discarding a data item belonging to the data flow, and ii) marking the data item belonging to the data flow.

In accordance with the invention, there is provided also a new computer program for data traffic management in a switch device of a network element. The switch device is configured to transfer data from ingress line interfaces of the network element to egress line interfaces of the network element in accordance with control information associated with the data. A computer program according to the invention comprises computer executable instructions for controlling a programmable processing system of the switch device to:
  compare data traffic load represented by a data flow directed to one of the egress line interfaces to a numerical value indicative of a maximum data transmission speed available to the data flow at the one of the egress line interfaces so as to generate a congestion indicator expressing whether the data flow is a potential cause of congestion at the one of the egress line interfaces, and
  direct a congestion control action to the data flow in response to a situation in which the data flow is, according to the congestion indicator, a potential cause of congestion, the congestion control action being one of: i) discarding a data item belonging to the data flow, and ii) marking the data item belonging to the data flow.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1A:
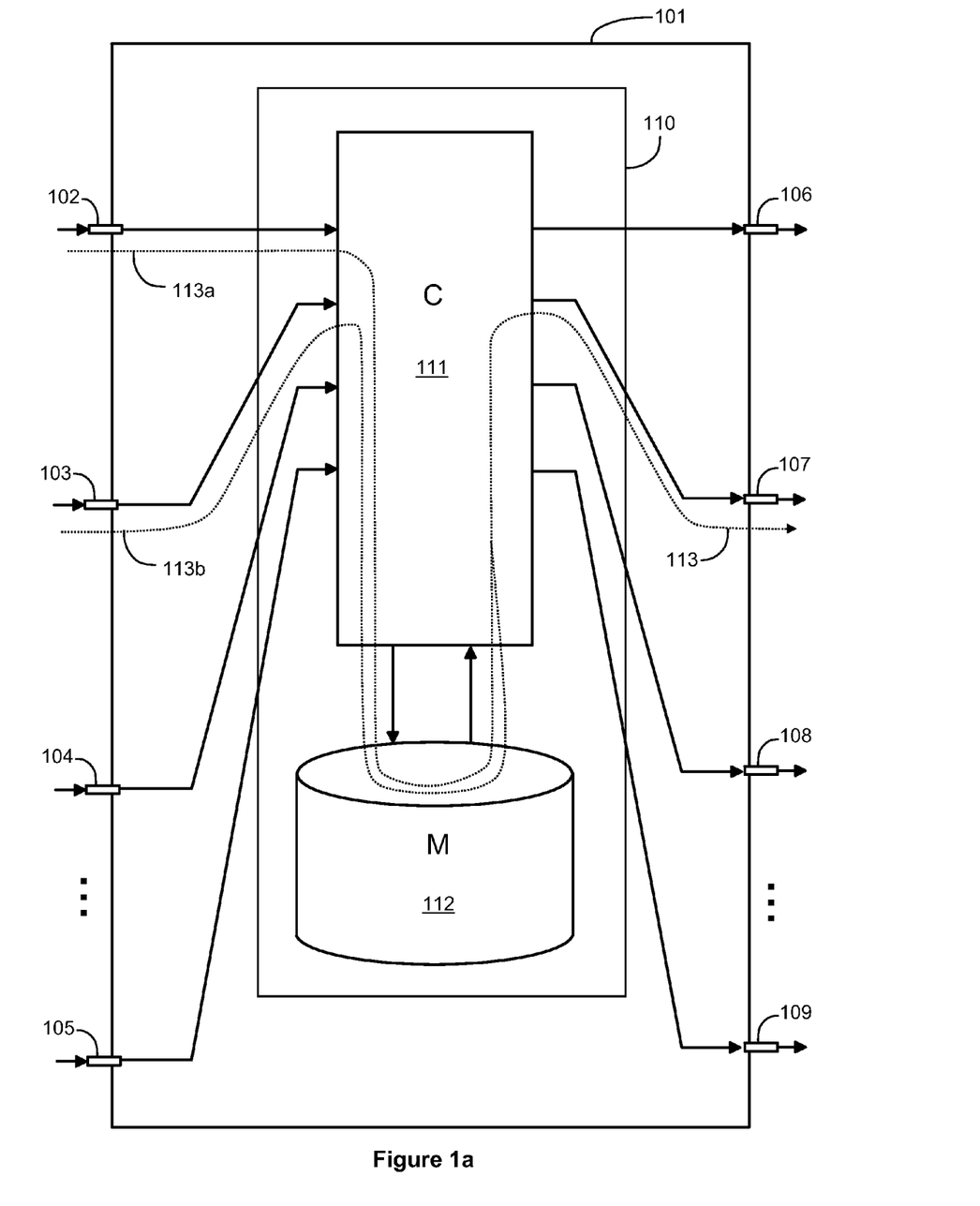
FIG. 1a shows a schematic block diagram of a switch device according to an exemplifying embodiment of the invention.

FIG. 1a shows a schematic block diagram of a switch device 101 according to an exemplifying embodiment of the invention. The switch device 101 can be used as a part of a network element of a data transfer network. The network element can be, for example, an Internet Protocol "IP" router, a multi-protocol label switching "MPLS" switch, an Asynchronous Transfer Mode "ATM" switch, a packet optical switch, and/or an Ethernet switch. The switch device 101 comprises ingress interfaces 102, 103, 104 and 105 connectable to ingress line interfaces of the network element and egress interfaces 106, 107, 108 and 109 connectable to egress line interfaces of the network element. The ingress line interfaces and the egress line interfaces of the network element are not shown in FIG. 1a. An egress line interface of the network element can be a physical egress port of the network element for connecting to a data transfer link that can be e.g. a fiber link, a copper link, or a radio link. It is also possible that an egress line interface is a logical egress port, i.e. a virtual egress port, implemented with a physical egress port so that a part of the capacity of the physical egress port has been allocated to the logical egress port.

The switch device 101 comprises a transfer system 110 for transferring data from the ingress interfaces 102-105 of the switch device to the egress interfaces 106-109 of the switch device in accordance with control information associated with the data. The data may comprise for example Internet Protocol "IP" packets and/or Ethernet frames and/or other protocol data units "PDU" depending on the data transfer protocols being used. The transfer system 110 comprises a control section 111 configured to compare data traffic load represented by a data flow directed to an egress line interface of the network element to capacity available to this data flow at the above-mentioned egress line interface. In the exemplifying situation illustrated in FIG. 1a, a data flow 113 is directed to one of the egress line interfaces of the network element via the egress interface 107 of the switch device 101. The data flow 113 is an aggregate of data flows 113a and 113b arriving via the ingress interfaces 102 and 103 as illustrated in FIG. 1a. The control section 111 is configured to generate a congestion indicator expressing whether the data flow 113 is a potential cause of congestion at the respective egress line interface of the network element. The congestion indicator is generated by comparing the data traffic load represented by the data flow 113 to the capacity available for the data flow 113 at the above-mentioned egress line interface. The control section 111 is configured to direct a congestion control action to the data flow 113 in response to a situation in which the data flow 113 is, according to the congestion indicator, a potential cause of congestion at the respective egress line interface. Typically, the congestion control action is directed to at least one data item, e.g. an IP packet or Ethernet frame, which belongs to the data flow 113. In a case where the egress line interface is a physical egress port, the capacity available to a data flow is typically the maximum data transmission speed of the physical egress port. Correspondingly, in a case where the egress line interface is a logical egress port, the capacity available to a data flow is typically the maximum data transmission speed allocated to the logical egress port. The maximum data transmission speed is expressible in bits/second or in bytes/second. Furthermore, in addition to the maximum data transmission speed, the capacity can include also the buffering capacity available to a data flow at an egress line interface under consideration. The buffering capacity is expressible in bits or bytes. Information expressing the capacities of the egress line interfaces of the network element can be given to the switch device 101 in a form of configuration parameters. A logical egress port can relate, for example but not necessarily, to a certain virtual local access network "VLAN" to which a certain share of a capacity of a certain physical egress port has been allocated. From the viewpoint of the switch device it can be immaterial whether an egress line interface is a physical egress port or a logical egress port.

In a switch device according to an exemplifying embodiment of the invention, the transfer system 110 comprises a memory 112 and the control section 111 is configured to write data received from the ingress interfaces 102-105 to the memory and to read a data item, e.g. an IP packet or Ethernet frame, from the memory when the data item is to be delivered to one or more of the egress interfaces 106-109. The memory 112 operates as shared buffering resource for the ingress line interfaces and for the egress line interfaces of the network element. A switch device according to another exemplifying embodiment of the invention comprises a data interface for connecting to an external memory.

Figure 1B:
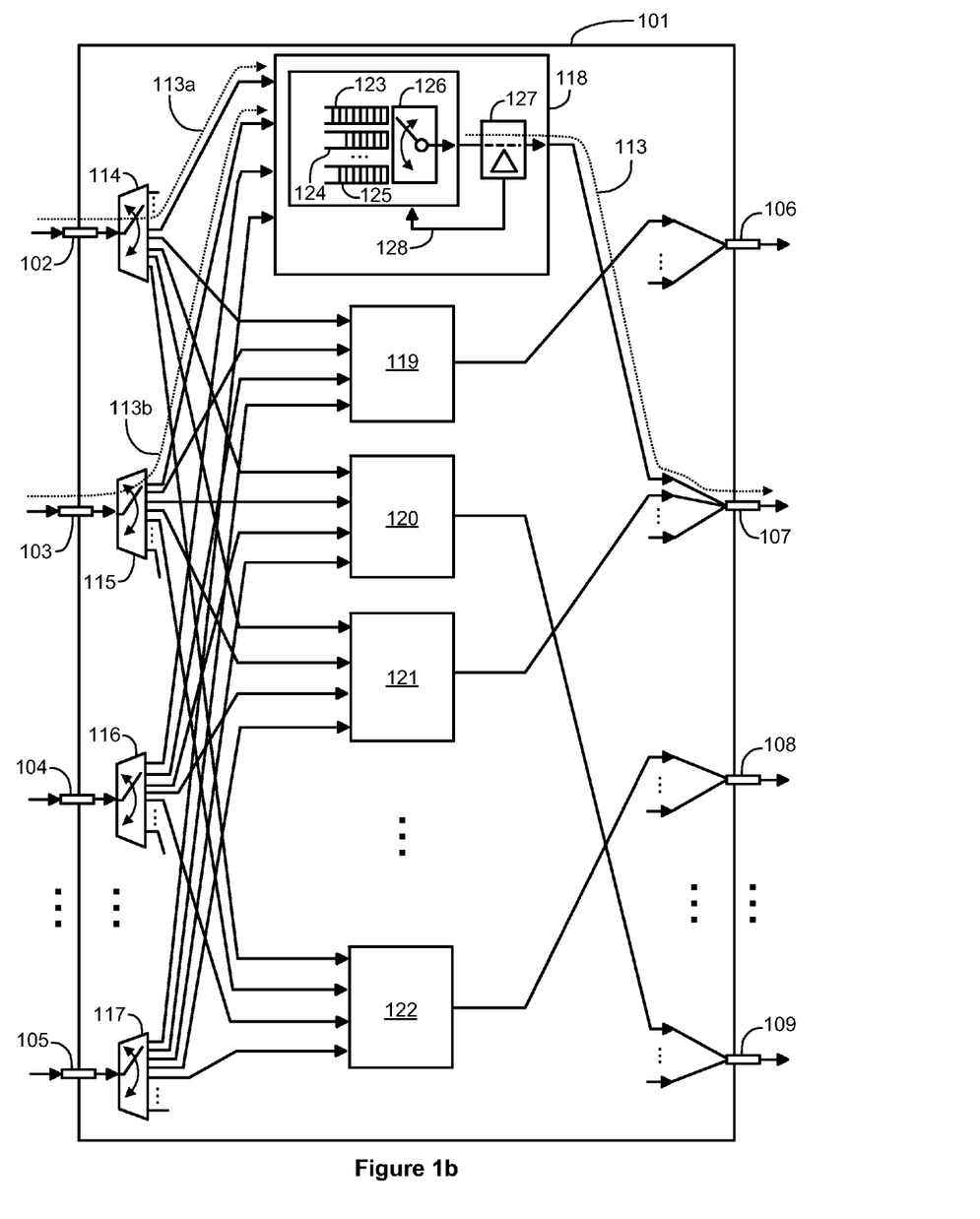
FIG. 1b illustrates the functionality of the exemplifying switch device presented in FIG. 1a, FIG. 2 shows a schematic block diagram of a network element according to an exemplifying embodiment of the invention.

FIG. 1b illustrates in greater detail the functionality of the exemplifying switch device 101 shown in FIG. 1a. FIG. 1b shows functionalities which are implemented with the aid of the control section 111 and the memory 112. Each of functionalities 114, 115, 116 and 117 delivers a data item, e.g. an IP packet or an Ethernet frame, received at the corresponding ingress interface 102, 103, 104 or 105 to such one of functionalities 118, 119, 120, 121 and 122 which is related to a particular one of the egress line interfaces of the network element via which the data item under consideration is to be forwarded to a data transfer network. The selection between the functionalities 118-122 can be based on control data associated with the data item. Each of the functionalities 118-122 can be related to a physical or logical egress port of the network element. Each of the functionalities 118-122 delivers data to such one of the egress interfaces 106-109 of the switch device 101 which provides a connection to the egress line interface related to that one of the functionalities 118-122. In the exemplifying case illustrated in FIG. 1b, each egress interface of the switch device 101 provides connections to many egress line interfaces of the network element. For example, the egress interface 107 provides connections, among others, to the egress line interface related to the functionality 118 and to another egress line interface related to the functionality 121. In a practical implementation, an egress interface of the switch device can be connected to a line interface module, e.g. a line card, which comprises a plurality of egress ports.

Each of the functionalities 118-122 compares data traffic load directed to a corresponding egress line interface, e.g. a physical or logical egress port, of the network element to the capacity available to the data traffic load in this egress line interface. In a case where the data traffic load exceeds a pre-determined percentage of the available capacity, a congestion control action is directed to a data flow representing the data traffic load. The functionalities 118-122 are explained in greater detail below with reference to the functionality 118 which is shown in greater detail in FIG. 1b than the functionalities 119-122. The functionality 118 implements queues 123, 124 and 125 for data items belonging to sub-flows of the data flow 113. The sub-flows may represent for example different quality of service "QoS" classes. The queues 123-125 can be implemented with linked lists or with other suitable data structures in the memory 112 illustrated in FIG. 1a. The functionality 118 comprises selection functionality 126 for selecting, from among the queues 123-125, the queue wherefrom a data item is to be delivered via the egress interface 107 to the corresponding egress line interface of the network element. After the queue has been selected, the selection functionality 126 delivers the data item from the head of the selected queue to the egress interface 107. The selection can be carried out for example using the strict priority "SP" scheduling principle, the weighted fair queuing "WFQ" scheduling principle, the Round-Robin "RR" scheduling principle, and/or some other suitable scheduling principle. The functionality 118 comprises a measuring functionality 127 for comparing the data load caused by the data flow 113 to the capacity available to the data flow 113 at the egress line interface of the network element and for generating a congestion indicator 128 that expresses whether the data flow 113 is a potential cause of congestion at the egress line interface. The functionality 118 directs a congestion control action to at least one data item belonging to the data flow 113 if the data flow is, according to the congestion indicator 128, a potential cause of congestion. The congestion control action can be carried out in many different ways. Some exemplifying ways for carrying out the congestion control action are explained below.

In a switch device according to an exemplifying embodiment of the invention, a data item that belongs to the data flow 113 is discarded, i.e. dropped, instead of en-queuing the data item to any of the queues 123-125 if the congestion indicator 128 expresses that the data flow is a potential cause of congestion. In other words, if the data flow 113 is a potential cause of congestion, the data item is discarded instead of writing the data item to the memory 112 illustrated in FIG. 1a.

In a switch device according to another exemplifying embodiment of the invention, the data item is discarded, i.e. dropped, with a constant or adjustable discarding probability if the congestion indicator 128 expresses that the data flow 113 is a potential cause of congestion. This can be implemented for example so that the control section 111 illustrated in FIG. 1a is configured to generate, in response to the situation in which the data flow 113 is a potential cause of congestion, a value of a random variable and to discard the data item only if the generated value of the random variable belongs to a given subset of the possible values of the random variable. The ratio of the size of the subset to the size of the whole set of the possible values of the random variable represents the above-mentioned discarding probability. The discarding probability is advantageously increased when the situation, where the data flow 113 is a potential cause of congestion, continues because the continuation of this situation indicates that the discarding probability is too low. The discarding probability can be increased by broadening the above-mentioned subset of the possible values of the random variable in response to the situation in which the data flow 113 is a potential cause of congestion. An advantage of the above-described functionality based on the discarding probability is the reduction of the risk of source synchronization in data traffic using the Transmission Control Protocol "TCP".

In a switch device according to an exemplifying embodiment of the invention, different discarding probabilities are used for data items belonging to the data flow 113 and representing different quality of service "QoS" classes. For example, the discarding probabilities used for the different QoS-classes can be increased at different rates when the situation, where the data flow 113 is a potential cause of congestion, continues. Furthermore, differentiated treatments for the different QoS-classes can be achieved by using different ways to decrease the discarding probability in conjunction with different QoS-classes when the congestion indicator 128 does not express that the data flow 113 would be a potential source of congestion. For example, the discarding probability used in conjunction with a first QoS-class that is more privileged than a second QoS-class can be set to zero immediately after the data flow 113 has ceased to be a potential cause of congestion, and the discarding probability used in conjunction with the second QoS-class can be gradually decreased towards zero when the data flow 113 is not a potential cause of congestion.

In addition to the congestion indicator 128 outputted by the measuring functionality 127, the usage level of the memory 112 illustrated in FIG. 1a can be used for deciding whether the congestion control action need to be directed to a data flow under consideration.

In a switch device according to an exemplifying embodiment of the invention, a data item belonging to the data flow 113 is discarded instead of writing the data item to the memory 112 in response to a situation in which the data flow 113 is a potential cause of congestion and the amount of data stored by the memory 112 exceeds a given limit. In other words, the data item is discarded instead of en-queuing the data item to any of the queues 123-125 when the data flow 113 is a potential cause of congestion and the amount of data stored by the memory 112 exceeds the given limit. The limit can be e.g. 60 . . . 90% of the capacity of the memory 112. The above-mentioned amount of data can be expressed e.g. in bits or bytes.

In a switch device according to an exemplifying embodiment of the invention, the capacity of the memory 112 is divided into shares which are allocated to the egress line interfaces, e.g. physical and/or logical egress ports, of the network element. A data item belonging to the data flow 113 is discarded instead of writing the data item to the memory 112 in response to a situation in which the data flow 113 is a potential cause of congestion and the amount of data stored by the memory 112 and directed to the egress line interface related to the functionality 118 exceeds an amount limit associated with this egress line interface. The amount limit can be e.g. 60 . . . 90% of the share of the memory capacity allocated to the egress line interface under consideration. In a case where the discarding probability is used in the way described earlier in this document, the discarding probability can be set to zero when the amount of the data stored by the memory 112 and directed to the egress line interface related to the functionality 118 is below the above-mentioned amount limit associated with this egress line interface.

In the above-described exemplifying cases, the congestion control action comprises discarding one or more data items. The congestion control action may also comprise marking a data item so that a data transfer protocol controlling a data flow, or a part of it, is informed about an evolving congestion and thereby the data transfer protocol is enabled to take actions for reducing the risk of the congestion. For example, the congestion control action may comprise the use of the explicit congestion notification "ECN" procedure supported by the Transmission Control Protocol "TCP". The discarding and the above-mentioned marking can be used together so that the marking is used first and, if the congestion still continues or even escalates, the discarding is taken into use.

In the above-described exemplifying cases, the congestion indicator 128 is used for controlling whether a data item under consideration is written to the memory 112 or discarded, i.e. whether the data item is en-queued to one of the queues 123-125 or discarded. It is also possible that the congestion indicator 128 is used for controlling the selection functionality 126 that selects, from among the queues 123-125, the queue wherefrom a data item is to be delivered via the egress interface 107 to the appropriate egress line interface of the network element. After the selection, the selection functionality 126 delivers the data item from the head of the selected queue to the egress interface 107. The selection functionality can be controlled for example so that the operation of the selection functionality 126 is interrupted when the congestion indicator 128 indicates congestion and continued when the congestion indicator 128 ceases to indicate the congestion. In this exemplifying case, the measuring functionality 127, the selection functionality 126, and the queues 123-125 constitute a shaper functionality which limits the data transfer speed and/or bursts of the data flow 113 so that the appropriate egress line interface of the network element is able to transmit the data flow 113 to a data transfer network. The queues 123-125 can be managed for example by using the tail dropping, the random early detection "RED" algorithm, or the weighted random early detection "WRED" algorithm.

The measuring functionality 127 for generating the congestion indicator 128 can be carried out in many different ways. Some exemplifying ways for carrying out the measuring functionality 127 are explained below.

In a switch device according to an exemplifying embodiment of the invention, the measuring functionality 127 measures the data transfer speed of the data flow 113. The measuring functionality 127 sets the congestion indicator 128 to express that the data flow 113 is a potential cause of congestion in response to a situation in which the measured data transfer speed exceeds a pre-determined percentage, e.g. 70-100%, of the maximum data transmission speed available to the data flow 113 at the appropriate egress line interface of the network element.

In a switch device according to an exemplifying embodiment of the invention, the measuring functionality 127 runs a rate measurement algorithm such as e.g. a token bucket, or leaky bucket, algorithm for determining whether the average data transfer speed of the data flow 113 exceeds a first pre-determined percentage, e.g. 70-100%, of the maximum data transmission speed available to the data flow 113 at the appropriate egress line interface of the network element and whether a burst size of the data flow exceeds a second pre-determined percentage, e.g. 70-100%, of a buffering capacity available to the data flow 113 at the egress line interface. The measuring functionality 127 sets the congestion indicator 128 to express that the data flow 113 is a potential cause of congestion in response to a situation in which the average data transfer speed of the data flow exceeds the first pre-determined percentage of the maximum data transmission speed and the burst size of the data flow exceeds the second pre-determined percentage of the buffering capacity. The measuring functionality 127 may further measure a peak data transfer speed of the data flow 113 and to set the congestion indicator 128 to express that the data flow 113 is a potential cause of congestion in response to a situation in which the measured peak data transfer speed exceeds a speed limit that can be e.g. the maximum data transmission speed available to the data flow 113 at the appropriate egress line interface of the network element.

The above-described functionalities 114-112 of the exemplifying switch device 101 are logical entities in the sense that they are not physical elements that would be interconnected as illustrated in FIG. 1*b* but, instead, they are implemented with the control section 111 and the memory 112 illustrated in FIG. 1*a*. Therefore, FIG. 1*b* is merely for the purpose of illustrating the functionality of the exemplifying switch device 101. It is, however, possible to construct a switch device so that functionalities of the kind described above are implemented with separate physical elements that are interconnected in the way shown in FIG. 1*b*. The control section 111 illustrated in FIG. 1*a* can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 2:
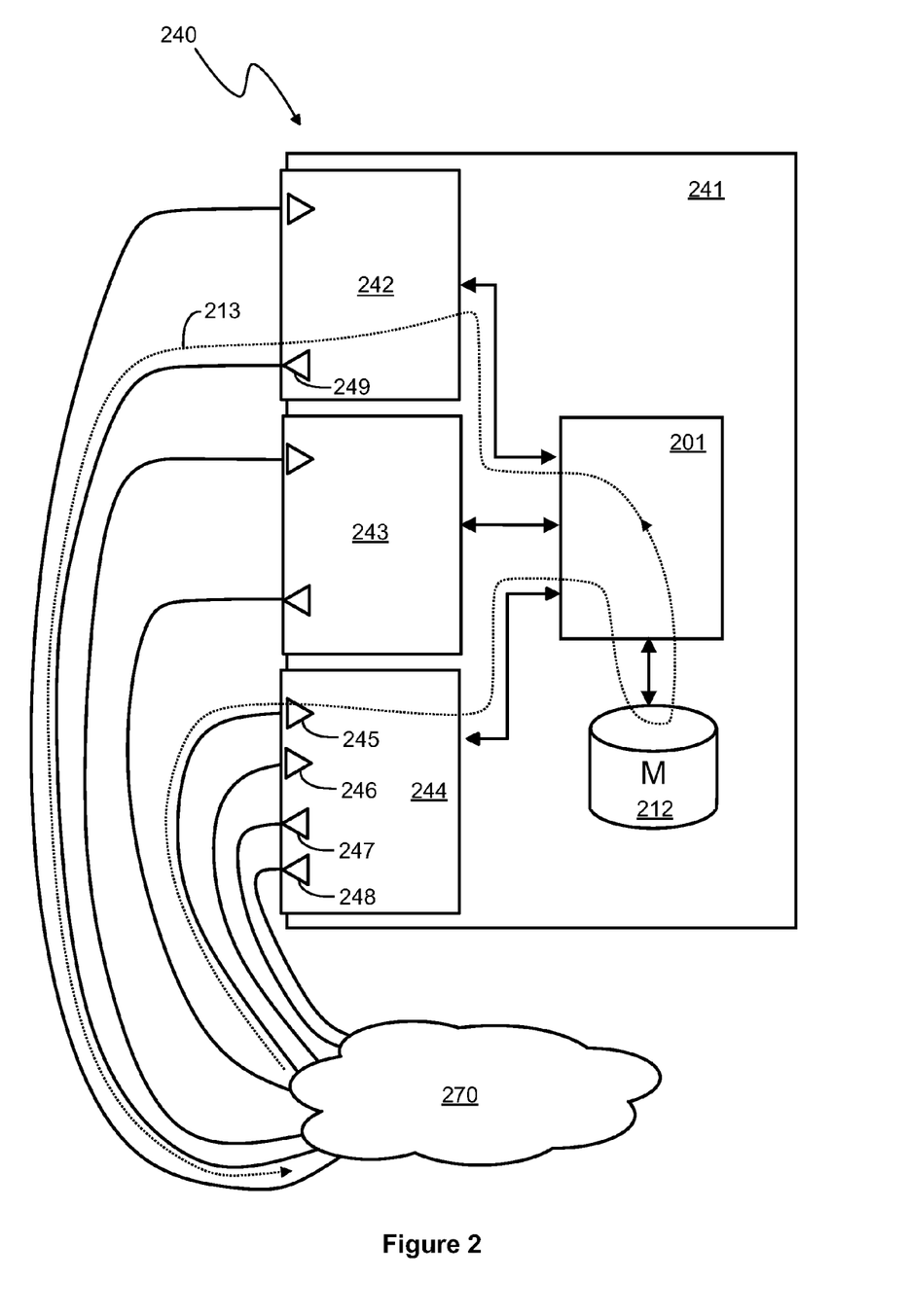

FIG. 2 shows a schematic block diagram of a network element 240 according to an exemplifying embodiment of the invention. The network element can be, for example, an Internet Protocol "IP" router, a multi-protocol label switching "MPLS" switch, an Asynchronous Transfer Mode "ATM" switch, a packet optical switch, and/or an Ethernet switch. In this exemplifying case, the network element comprises a frame 241 and line interface modules 242, 243 and 244. The line interface modules 242-243 can be for example plug-in units installed in plug-in unit slots of the frame 241. The line interface modules comprise ingress line interfaces for receiving data from a data transfer network 270. Two of the ingress line interfaces are denoted with reference numbers 245 and 246. The line interface modules comprise egress line interfaces for transmitting a data to the data transfer network. Three of the egress line interfaces are denoted with reference numbers 247, 248 and 249. The network element comprises a switch device 201 for transferring data from the ingress line interfaces to the egress line interfaces in accordance with control information associated with the data. Also the switch device 201 can be a plug-in unit installed in a plug-in unit slot of the frame 241. The switch device 201 can be a switch device according to any of the above-described exemplifying embodiments of the invention. The switch device 201 comprises:

ingress interfaces connected to the ingress line interfaces of the line interface modules 242-244, egress interfaces connected to the egress line interfaces of the line interface modules 242-244, and a transfer system for transferring data from the ingress interfaces to the egress interfaces in accordance with control information associated with the data.

The transfer system of the switch device 201 comprises control section configured to:

compare data traffic load represented by a data flow directed to one of the egress line interfaces to capacity available to the data flow at the one of the egress line interfaces so as to generate a congestion indicator expressing whether the data flow is a potential cause of congestion at the one of the egress line interfaces, and direct a congestion control action to the data flow in response to a situation in which the data flow is, according to the congestion indicator, a potential cause of congestion.

An exemplifying data flow 213 is depicted with a dashed line in FIG. 2. In conjunction with the data flow 213, the above mentioned one of the egress line interfaces is the egress line interface 249.

The switch device 201 comprises a data interface for connecting to a memory 212 which can be used as a shared memory resource for all the ingress line interfaces and the egress line interfaces of the network element 240.

Figure 3:
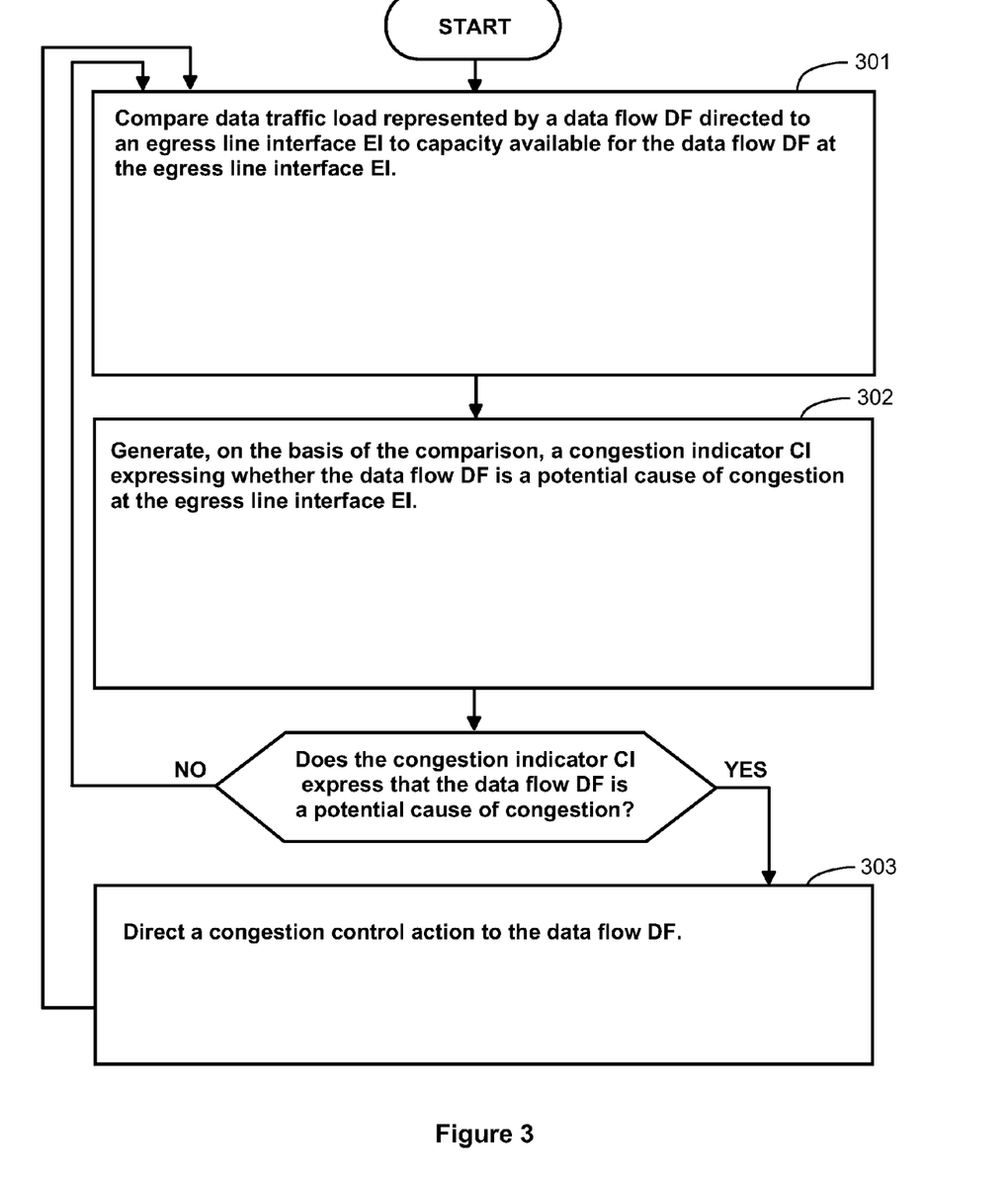
FIG. 3 shows a flow chart of a method according to an exemplifying embodiment of the invention for data traffic management.

FIG. 3 shows a flow chart of a method according to an exemplifying embodiment of the invention for data traffic management in a switch device of a network element. The switch device is configured to transfer data from ingress line interfaces of the network element to egress line interfaces of the network element in accordance with control information associated with the data. The method comprises the following actions 301, 302 and 303:

the action 301: comparing data traffic load represented by a data flow directed to one of the egress line interfaces to capacity available to the data flow at the one of the egress line interfaces, the action 302: generating, on the basis of the comparison, a congestion indicator expressing whether the data flow is a potential cause of congestion at the one of the egress line interfaces, and the action 303: directing a congestion control action to the data flow in response to a situation in which the data flow is, according to the congestion indicator, a potential cause of congestion.

A method according to an exemplifying embodiment of the invention comprises discarding a data item belonging to the data flow instead of delivering the data item to the one of the egress line interfaces of the network element in response to the situation in which the data flow is a potential cause of congestion. In this case, the discarding the data item represents the congestion control action.

A method according to an exemplifying embodiment of the invention comprises:

generating a value of a random variable in response to the situation in which the data flow is a potential cause of congestion, and discarding a data item belonging to the data flow instead of delivering the data item to the one of the egress line interfaces of the network element in response to a situation in which the generated value of the random variable belongs to a given subset of the possible values of the random variable. In this case, the discarding the data item represents the congestion control action.

A method according to an exemplifying embodiment of the invention comprises broadening the subset of the possible values of the random variable so as to increase the discarding probability in response to the situation in which the data flow is a potential cause of congestion.

A method according to an exemplifying embodiment of the invention comprises writing a data item belonging to the data flow to a memory after receiving the data item from an ingress line interface of the network element and reading the data item from the memory when the data item is to be delivered to the one of the egress line interfaces of the network element.

A method according to an exemplifying embodiment of the invention comprises discarding the data item instead of writing the data item to the memory in response to a situation in which the data flow is a potential cause of congestion and amount of data stored by the memory and directed to the one of the egress line interfaces of the network element exceeds an amount limit. In this case, the discarding the data item represents the congestion control action.

A method according to an exemplifying embodiment of the invention comprises:

generating a value of a random variable in response to a situation in which the data flow is a potential cause of congestion and amount of data stored by the memory and directed to the one of the egress line interfaces of the network element exceeds an amount limit, and discarding the data item instead of writing the data item to the memory in response to a situation in which the generated value of the random variable belongs to a given subset of the possible values of the random variable. In this case, the discarding the data item represents the congestion control action.

A method according to an exemplifying embodiment of the invention comprises broadening the subset of the possible values of the random variable so as to increase the discarding probability in response to the situation in which the data flow is a potential cause of congestion and the amount of data stored by the memory and directed to the one of the egress line interfaces of the network element exceeds the amount limit.

A method according to an exemplifying embodiment of the invention comprises reducing the subset of the possible values of the random variable so as to decrease the discarding probability in response to a situation in which the data flow is not a potential cause of congestion.

A method according to an exemplifying embodiment of the invention comprises making the subset of the possible values of the random variable to be an empty set in response to a situation in which the amount of data stored by the memory and directed to the one of the egress line interfaces of the network element is less than the amount limit.

A method according to an exemplifying embodiment of the invention comprises measuring a data transfer speed of the data flow and setting the congestion indicator to express that the data flow is a potential cause of congestion in response to a situation in which the measured data transfer speed exceeds a predetermined percentage of the maximum data transmission speed available to the data flow at the one of the egress line interfaces.

A method according to an exemplifying embodiment of the invention comprises:

running a rate measurement algorithm such as e.g. a token bucket, or a leaky bucket, algorithm for determining whether the average data transfer speed of the data flow exceeds a first pre-determined percentage of the maximum data transmission speed available to the data flow at the one of the egress line interfaces and whether a burst size of the data flow exceeds a second pre-determined percentage of a buffering capacity available to the data flow at the one of the egress line interfaces, and setting the congestion indicator to express that the data flow is a potential cause of congestion in response to a situation in which the average data transfer speed of the data flow exceeds the first pre-determined percentage of the maximum data transmission speed and the burst size of the data flow exceeds the second pre-determined percentage of the buffering capacity.

A method according to an exemplifying embodiment of the invention comprises measuring a peak data transfer speed of the data flow and to set the congestion indicator to express that the data flow is a potential cause of congestion in response to a situation in which the measured peak data transfer speed exceeds a speed limit that can be e.g. the maximum data transmission speed available to the data flow at the one of the egress line interfaces.

A computer program according to an exemplifying embodiment of the invention for data traffic management in a switch device comprises computer executable instructions for controlling a programmable processing system of the switch device to carry out a method according to any of the above-described exemplifying embodiments of the invention.

A computer program according to an exemplifying embodiment of the invention comprises software modules for data traffic management in a switch device of a network element. The switch device is configured to transfer data from ingress line interfaces of the network element to egress line interfaces of the network element in accordance with control information associated with the data. The software modules comprise computer executable instructions for controlling a programmable processing system of the switch device to:
- compare data traffic load represented by a data flow directed to one of the egress line interfaces to capacity available to the data flow at the one of the egress line interfaces so as to generate a congestion indicator expressing whether the data flow is a potential cause of congestion at the one of the egress line interfaces, and
- direct a congestion control action to the data flow in response to a situation in which the data flow is, according to the congestion indicator, a potential cause of congestion.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc "CD", encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A switch device configured to be a part of a network element of a data transfer network, the switch device comprising:
   ingress interfaces connectable to ingress line interfaces of the network element;
   egress interfaces connectable to egress line interfaces of the network element; and
   a transfer system configured to transfer data from the ingress interfaces to the egress interfaces in accordance with control information associated with the data, the transfer system comprising
   a control section configured to:
      compare data traffic load represented by a data flow directed to one of the egress line interfaces of the network element to a numerical value indicative of a maximum data transmission speed available to the data flow at the one of the egress line interfaces of the network element so as to generate a congestion indicator expressing whether the data flow is a potential cause of congestion at the one of the egress line interfaces of the network element, and
      direct a congestion control action to the data flow in response to a situation in which the data flow is, according to the congestion indicator, the potential cause of congestion, the congestion control action being one of: i) discarding a data item belonging to the data flow, and ii) marking the data item belonging to the data flow.

2. The switch device according to claim 1, wherein the control section is configured to:
   generate a value of a random variable in response to the situation in which the data flow is the potential cause of congestion, and
   discard the data item belonging to the data flow instead of controlling the data item to be delivered to the one of the egress line interfaces of the network element in response to a situation in which the generated value of the random variable belongs to a given subset of possible values of the random variable, discarding the data item representing the congestion control action.

3. The switch device according to claim 2, wherein the control section is configured to broaden the subset of the possible values of the random variable so as to increase a discarding probability in response to the situation in which the data flow is the potential cause of congestion.

4. The switch device according to claim 1, wherein the transfer system comprises a memory for storing the data item belonging to the data flow and the control section is configured to write the data item to the memory and to read the data item from the memory when the data item is to be delivered to the one of the egress line interfaces of the network element.

5. The switch device according to claim 4, wherein the control section is configured to discard the data item instead of writing the data item to the memory in response to a situation in which the data flow is the potential cause of congestion and amount of data stored by the memory and directed to the one of the egress line interfaces of the network element exceeds an amount limit, discarding the data item representing the congestion control action.

6. The switch device according to claim 4, wherein the control section is configured to:
   generate a value of a random variable in response to a situation in which the data flow is the potential cause of congestion and amount of data stored by the memory and directed to the one of the egress line interfaces of the network element exceeds an amount limit, and
   discard the data item instead of writing the data item to the memory in response to a situation in which the generated value of the random variable belongs to a given subset of possible values of the random variable, discarding the data item representing the congestion control action.

7. The switch device according to claim 6, wherein the control section is configured to broaden the subset of the possible values of the random variable so as to increase a discarding probability in response to the situation in which the data flow is the potential cause of congestion and the amount of data stored by the memory and directed to the one of the egress line interfaces of the network element exceeds the amount limit.

8. The switch device according to claim 2, wherein the control section is configured to reduce the subset of the possible values of the random variable so as to decrease a discarding probability in response to a situation in which the data flow is not the potential cause of congestion.

9. The switch device according to claim 6, wherein the control section is configured to reduce the subset of the possible values of the random variable so as to decrease a discarding probability in response to a situation in which the data flow is not the potential cause of congestion.

10. The switch device according to claim 6, wherein the control section is configured to make the subset of the possible values of the random variable to be an empty set in response to a situation in which the amount of data stored by the memory and directed to the one of the egress line interfaces of the network element is less than the amount limit.

11. The switch device according to claim 1, wherein the control section is configured to measure a data transfer speed of the data flow and to set the congestion indicator to express that the data flow is the potential cause of congestion in response to a situation in which the measured data transfer speed exceeds a pre-determined percentage of the maximum data transmission speed available to the data flow at the one of the egress line interfaces.

12. The switch device according to claim 1, wherein the control section is configured to:
  run a rate measurement algorithm for determining whether an average data transfer speed of the data flow exceeds a first pre-determined percentage of the maximum data transmission speed available to the data flow at the one of the egress line interfaces and whether a burst size of the data flow exceeds a second pre-determined percentage of a buffering capacity available to the data flow at the one of the egress line interfaces, and
  set the congestion indicator to express that the data flow is the potential cause of congestion in response to a situation in which the average data transfer speed of the data flow exceeds the first pre-determined percentage of the maximum data transmission speed and the burst size of the data flow exceeds the second pre-determined percentage of the buffering capacity.

13. The switch device according to claim 12, wherein the control section is configured to measure a peak data transfer speed of the data flow and to set the congestion indicator to express that the data flow is the potential cause of congestion in response to a situation in which the measured peak data transfer speed exceeds a speed limit.

14. A network element comprising:
  one or more ingress line interfaces for receiving data from a data transfer network;
  one or more egress line interfaces for transmitting the data to the data transfer network; and
  a switch device configured to transfer the data from the ingress line interfaces to the egress line interfaces in accordance with control information associated with the data, the switch device comprising:
    ingress interfaces connected to the ingress line interfaces of the network element,
    egress interfaces connected to the egress line interfaces of the network element, and
    a transfer system configured to transfer the data from the ingress interfaces to the egress interfaces in accordance with the control information associated with the data, the transfer system comprising a control section configured to:
      compare data traffic load represented by a data flow directed to one of the egress line interfaces of the network element to a numerical value indicative of a maximum data transmission speed available to the data flow at the one of the egress line interfaces of the network element so as to generate a congestion indicator expressing whether the data flow is a potential cause of congestion at the one of the egress line interfaces of the network element, and
      direct a congestion control action to the data flow in response to a situation in which the data flow is, according to the congestion indicator, the potential cause of congestion, the congestion control action being one of: i) discarding a data item belonging to the data flow, and ii) marking the data item belonging to the data flow.

15. The network element according to claim 14, wherein the network element is at least one of the following: an Internet Protocol IP router, a Multi-Protocol Label Switching MPLS switch, an Asynchronous Transfer Mode ATM switch, a packet optical switch, an Ethernet switch.

16. A method for managing data traffic transferred by a switch device from ingress line interfaces of a network element to egress line interfaces of the network element, the method comprising:
  comparing data traffic load represented by a data flow directed to one of the egress line interfaces of the network element to a numerical value indicative of a maximum data transmission speed available to the data flow at the one of the egress line interfaces of the network element so as to generate a congestion indicator expressing whether the data flow is a potential cause of congestion at the one of the egress line interfaces of the network element; and
  directing a congestion control action to the data flow in response to a situation in which the data flow is, according to the congestion indicator, the potential cause of congestion, the congestion control action being one of: i) discarding a data item belonging to the data flow, and ii) marking the data item belonging to the data flow.

17. A non-transitory computer readable medium encoded with a computer program for controlling a switch device configured to transfer data from ingress line interfaces of a network element to egress line interfaces of the network element in accordance with control information associated with the data, the computer program comprising computer executable instructions for controlling a programmable processing system of the switch device to:
  compare data traffic load represented by a data flow directed to one of the egress line interfaces of the network element to a numerical value indicative of a maximum data transmission speed available to the data flow at the one of the egress line interfaces of the network element so as to generate a congestion indicator expressing whether the data flow is a potential cause of congestion at the one of the egress line interfaces of the network element; and
  direct a congestion control action to the data flow in response to a situation in which the data flow is, according to the congestion indicator, the potential cause of congestion, the congestion control action being one of: i) discarding a data item belonging to the data flow, and ii) marking the data item belonging to the data flow.

* * * * *